Patented Apr. 21, 1925.

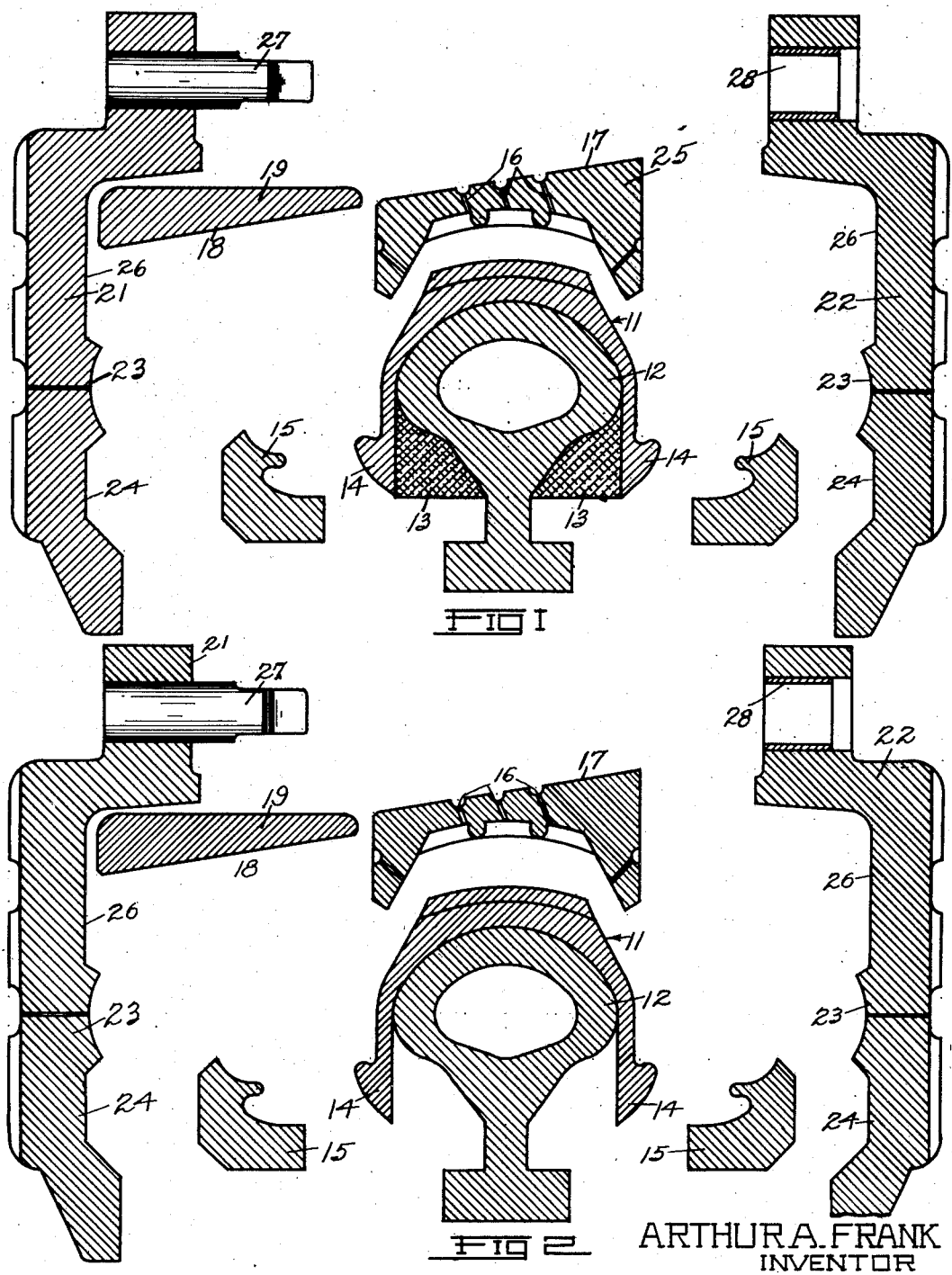

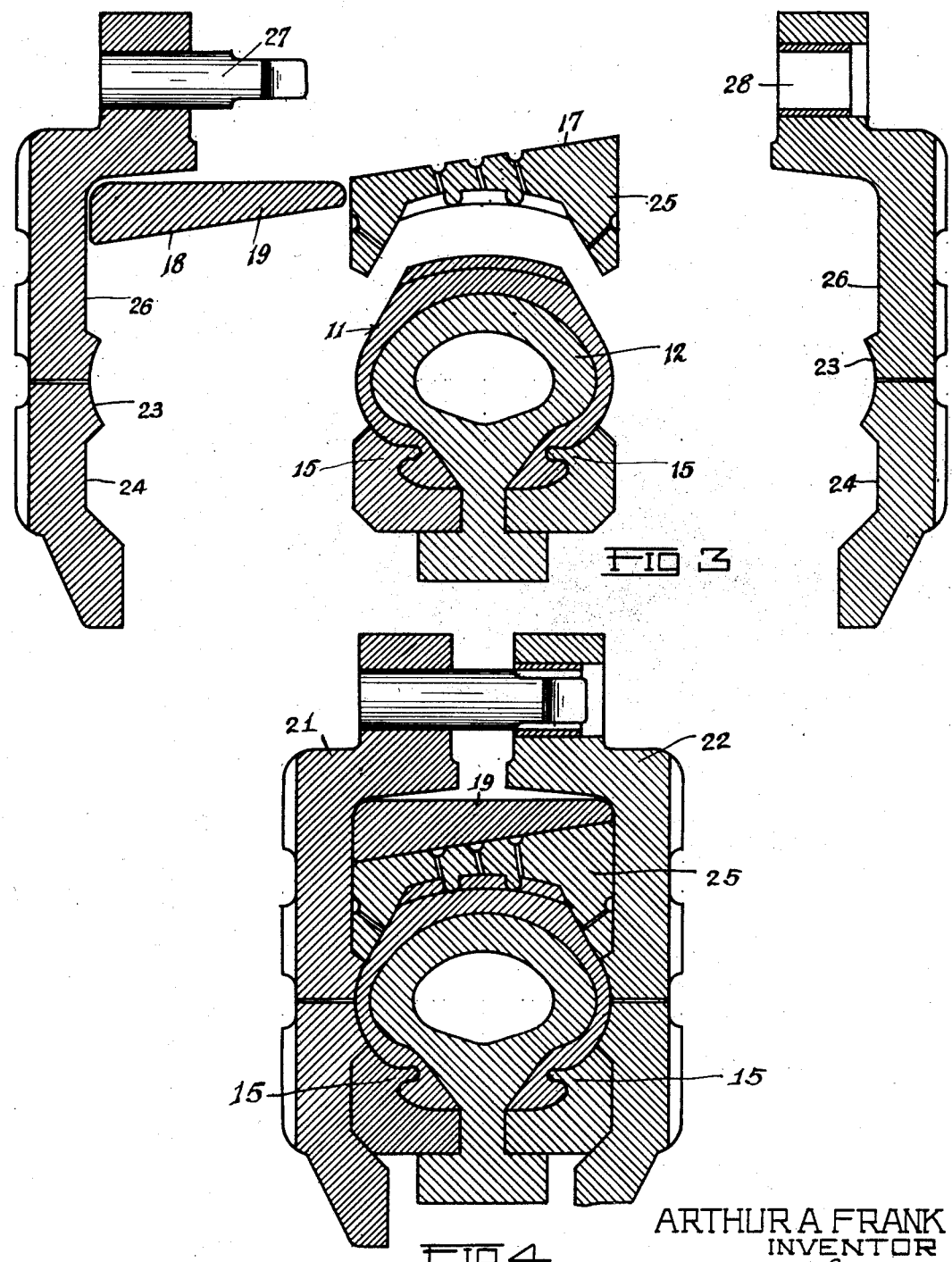

1,534,777

UNITED STATES PATENT OFFICE.

ARTHUR A. FRANK, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

PROCESS OF MOLDING PNEUMATIC CASINGS.

Application filed August 19, 1921. Serial No. 493,515.

*To all whom it may concern:*

Be it known that I, ARTHUR A. FRANK, a citizen of the United States, and a resident of Milwaukee, in the county of Milwaukee and State of Wisconsin, have invented certain new and useful Improvements in Processes of Molding Pneumatic Casings, of which the following is a specification.

My invention relates to pneumatic casings and the principal object of my invention is to provide a new and improved method of producing such casings. In the description herein I have set forth, for purposes of illustration, one form which my invention may assume.

According to this illustrative embodiment of my invention the casing is tensioned in the direction of its cross-sectional periphery and the tension then increased to thereby stretch the casing and thus elongate the cross-sectional periphery thereof. After the casing has been tensioned and preferably after it has been partly or fully stretched the tread portion of the casing, and preferably the side wall portions also, are full-molded, preferably by the application of non-buckling pressure thereto, such as radial pressure, that is, pressure applied in a direction substantially perpendicular to the tire surface.

In the drawings accompanying this specification and forming a part thereof I have shown, for purposes of illustration, apparatus suitable for carrying out the above described process.

Figure 1 shows diagrammatically the various mold elements at the beginning of the process, Figure 2 is a similar view with the core pads removed, Figure 3 is a similar view with the bead rings in position, and Figure 4 shows the completely assembled mold.

In the drawings I have shown a casing 11 mounted on a core 12 and in Figure 1 I have shown this casing as it appears upon the completion of the construction thereof and accordingly in this figure I have shown core pads 13 lying between the beads 14 and the core 12.

The mold disclosed in the drawings comprises a pair of rings 15 adapted to engage the beads 14 of the casing 11 and a plurality of sectional tread plates 25 preferably four in number and each adapted to engage the tread portion of the casing 11 and provided with suitable vents 16 and with an inclined outer surface 17 adapted to be engaged by the bevelled inner surface 18 of a ring 19 which may be slipped over the sections 25 to thereby force them together to full-mold the tread portion of the casing between the plates 25 and the core 12 to thereby impress the design of the plates 25 upon the tread. The sidewall sections of the casing 11 are engaged by the surfaces 23 of the two mold sections 21 and 22 and full-molded between these faces 23 and the core 12. Each mold section is also provided with a surface 26 adapted to engage the ring 19 and the segmental tread plates 25 and with a surface 24 adapted to engage a bead ring 15 and the mold section 21 is provided with a pin 27 adapted to enter an aperture 28 in the mold section 22 to thereby compel registration of the two mold sections 21 and 22.

In molding a casing with the apparatus above described the casing is built on the core with the aid of core pads as shown in Figure 1 and the casing so formed is of reduced cross-sectional periphery. These core pads are then removed as shown in Figure 2 to place the casing in condition for molding and the bead rings 15 are forced inwardly to seat against the core 12 as shown in Figure 3 and locked in this position. Such inward movement of the rings 15 first tensions and then actually stretches the casing 11 and the stretch is obviously about the periphery of the core 12 and in the direction of the cross-sectional periphery of the casing 11. The tread plates 25 are then applied and forced home by means of the ring 19 which may be driven home on the plates 25 either before the mold sections 21 and 22 are applied or by the application of these sections. The application of the mold sections 21 and 22 completes the mold as shown in Figure 4 and causes the surfaces 23 to engage the side-wall portions of the casing 11 to thereby full-mold these portions between the surfaces 23 and the core 12.

The apparatus herein described is but one of many which might be utilized to carry out my invention and the manner in which my invention is carried out by this apparatus is but one of many ways. The disclosure herein is illustrative only and my invention is not limited thereto.

I claim:

1. The process of molding a casing which comprises tensioning and then stretching the casing in the direction of the cross-sectional periphery, and full-molding the tread portion by radial pressure applied thereto after said tensioning.

2. The process of molding a casing which comprises tensioning and then stretching the casing in the direction of the cross-sectional periphery, and full-molding the tread portion by sectional thread bands applied thereto after tensioning.

3. The process of molding a casing which comprises tensioning and then stretching the casing in the direction of the cross-sectional periphery, and full-molding the sidewalls and tread portions by substantially radial pressure applied thereto after said tensioning.

4. The process of molding a casing which comprises tensioning and then stretching the casing in the direction of the cross-sectional periphery, and full-molding the sidewall and tread portions by mold sections and sectional tread plates, respectively, applied thereto after said tensioning.

5. The process of molding a casing which comprises stretching the casing in the direction of the cross-sectional periphery, and then full-molding the tread portion by radial pressure.

6. The process of molding a casing which comprises stretching the casing in the direction of the cross-sectional periphery, and then full-molding the tread portion by tread bands.

7. The process of molding a casing which comprises stretching the casing in the direction of the cross-sectional periphery, and then full-molding the sidewall and tread portions by substantially radial pressure.

8. The process of molding a casing which comprises stretching the casing in the direction of the cross-sectional periphery, and then full-molding the sidewall and tread portions by mold sections and sectional tread plates, respectively.

9. The process of molding a casing which comprises exerting tension on the beads thereof to first tension and then stretch the casing in the direction of the cross-sectional periphery, and full-molding the tread portion by radial pressure applied thereto after said tensioning.

10. The process of molding a casing which comprises mounting the casing upon a core, drawing the beads about the core to first tension and then stretch the casing in the direction of the cross-sectional periphery, and full-molding the tread portion by radial pressure applied thereto after said tensioning.

11. The process of molding a casing which comprises mounting the casing upon a core with the beads spaced from the core, engaging the beads with bead rings, forcing the bead rings in against the core to first tension and then stretch the casing in the direction of the cross-sectional periphery, and full-molding the tread portion by radial pressure applied thereto after said tensioning.

12. The process of molding a casing which comprises building the casing upon a core with the aid of core pads, removing said pads, engaging the beads with bead rings, forcing the bead rings in against the core to first tension and then stretch the casing in the direction of the cross-sectional periphery, and full-molding the tread portion by radial pressure applied thereto after said tensioning.

13. The process of molding a casing which comprises exerting tension on the beads thereof to first tension and then stretch the casing in the direction of the cross-sectional periphery, and full-molding the tread portion by sectional tread bands applied thereto after tensioning.

14. The process of molding a casing which comprises mounting the casing upon a core, drawing the beads about the core to first tension and then stretch the casing in the direction of the cross-sectional periphery, and full-molding the tread portion by sectional tread bands applied thereto after tensioning.

15. The process of molding a casing which comprises mounting the casing upon a core with the beads spaced from the core, engaging the beads with bead rings, forcing the bead rings in against the core to first tension and then stretch the casing in the direction of the cross-sectional periphery, and full-molding the tread portion by sectional tread bands applied thereto after tensioning.

16. The process of molding a casing which comprises building the casing upon a core with the aid of core pads, removing said pads, engaging the beads with bead rings, forcing the bead rings in against the core to first tension and then stretch the casing in the direction of the cross-sectional periphery, and full-molding the tread portion by sectional tread bands applied thereto after tensioning.

17. The process of molding a casing which comprises exerting tension on the beads thereof to first tension and then stretch the casing in the direction of the cross-sectional periphery, and full-molding the sidewalls and tread portions by substantially radial pressure applied thereto after said tensioning.

18. The process of molding a casing which comprises mounting the casing upon a core, drawing the beads about the core to first tension and then stretch the casing in the direction of the cross-sectional periphery, and full-molding the sidewalls and tread portions by substantially radial pressure applied thereto after said tensioning.

19. The process of molding a casing which comprises mounting the casing upon a core with the beads spaced from the core, engaging the beads with bead rings, forcing the bead rings in against the core to first tension and then stretch the casing in the direction of the cross-sectional periphery, and full-molding the sidewalls and tread portions by substantially radial pressure applied thereto after said tensioning.

20. The process of molding a casing which comprises building the casing upon a core with the aid of core pads, removing said pads, engaging the beads with bead rings, forcing the bead rings in against the core to first tension and then stretch the casing in the direction of the cross-sectional periphery, and full-molding the sidewalls and tread portions by substantially radial pressure applied thereto after said tensioning.

21. The process of molding a casing which comprises exerting tension on the beads thereof to first tension and then stretch the casing in the direction of the cross-sectional periphery, and then full-molding the tread portion by radial pressure.

22. The process of molding a casing which comprises mounting the casing upon a core, drawing the beads about the core to first tension and then stretch the casing in the direction of the cross-sectional periphery, and then full-molding the tread portion by radial pressure.

23. The process of molding a casing which comprises mounting the casing upon a core with the beads spaced from the core, engaging the beads with bead rings, forcing the bead rings in against the core to first tension and then stretch the casing in the direction of the cross-sectional periphery, and then full-molding the tread portion by radial pressure.

24. The process of molding a casing which comprises building the casing upon a core with the aid of core pads, removing said pads, engaging the beads with bead rings, forcing the bead rings against the core to first tension and then stretch the casing in the direction of the cross-sectional periphery, and then full-molding the tread portion by radial pressure.

25. The process of molding a casing which comprises exerting tension on the beads thereof to first tension and then stretch the casing in the direction of the cross-sectional periphery, and then full-molding the tread portion by tread bands.

26. The process of molding a casing which comprises mounting the casing upon a core, drawing the beads about the core to first tension and then stretch the casing in the direction of the cross-sectional periphery, and then full-molding the tread portion by tread bands.

27. The process of molding a casing which comprises mounting the casing upon a core with the beads spaced from the core, engaging the beads with bead rings, forcing the bead rings in against the core to first tension and then stretch the casing in the direction of the cross-sectional periphery, and then full-molding the tread portion by tread bands.

28. The process of molding a casing which comprises building the casing upon a core with the aid of core pads, removing said pads, engaging the beads with bead rings, forcing the bead rings in against the core to first tension and then stretch the casing in the direction of the cross-sectional periphery, and then full-molding the tread portion by tread bands.

29. The process of molding a casing which comprises exerting tension on the beads thereof to first tension and then stretch the casing in the direction of the cross-sectional periphery, and then full-molding the sidewall and tread portions by substantially radial pressure.

30. The process of molding a casing which comprises mounting the casing upon a core, drawing the beads about the core to first tension and then stretch the casing in the direction of the cross-sectional periphery, and then full-molding the sidewall and tread portions by substantially radial pressure.

31. The process of molding a casing which comprises mounting the casing upon a core with the beads spaced from the core, engaging the beads with bead rings, forcing the bead rings in against the core to first tension and then stretch the casing in the direction of the cross-sectional periphery, and then full-molding the sidewall and tread portions by substantially radial pressure.

32. The process of molding a casing which comprises building the casing upon a core with the aid of core pads, removing said pads, engaging the beads with bead rings, forcing the bead rings in against the core to first tension and then stretch the casing in the direction of the cross-sectional periphery, and then full-molding the sidewall and tread portions by substantially radial pressure.

33. The process of molding a casing which comprises exerting tension on the beads thereof to first tension and then stretch the casing in the direction of the cross-sectional periphery, and then full-molding the sidewall and tread portions by mold sections and sectional tread plates, respectively.

34. The process of molding a casing which comprises mounting the casing upon a core, drawing the beads about the core to first tension and then stretch the casing in the direction of the cross-sectional periphery, and then full-molding the sidewall and tread portions by mold sections and sectional tread plates, respectively.

35. The process of molding a casing which comprises mounting the casing upon a core with the beads spaced from the core, engaging the beads with bead rings, forcing the bead rings in against the core to first tension and then stretch the casing in the direction of the cross-sectional periphery, and then full-molding the sidewall and tread portions by mold sections and sectional tread plates, respectively.

36. The process of molding a casing which comprises building the casing upon a core with the aid of core pads, removing said pads, engaging the beads with bead rings, forcing the bead rings in against the core to first tension and then stretch the casing in the direction of the cross-sectional periphery, and then full-molding the sidewall and tread portions by mold sections and sectional tread plates, respectively.

In testimony whereof I have signed my name to the above specification.

ARTHUR A. FRANK.